May 23, 1933.   P. MOOS   1,910,035
ELECTRICITY METER
Filed May 13, 1930

INVENTOR.
Paul Moos
BY John D Morgan
ATTORNEY.

Patented May 23, 1933

1,910,035

UNITED STATES PATENT OFFICE

PAUL MOOS, OF ZUG, SWITZERLAND, ASSIGNOR TO LANDIS & GYR, A. G., A CORPORATION OF SWITZERLAND

ELECTRICITY METER

Application filed May 13, 1930, Serial No. 452,017, and in Switzerland May 24, 1929.

The present invention relates to electricity meters and more particularly to a new and improved terminal mounting for such meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serve to explain the principles of the invention.

Figure 1:
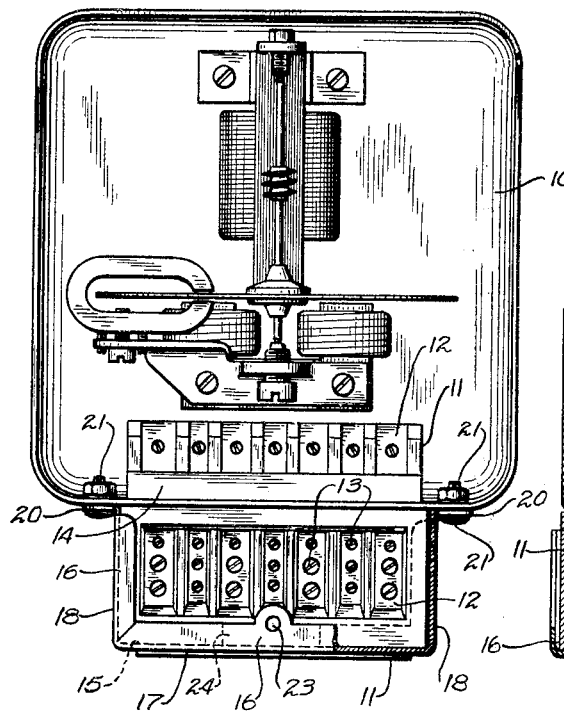
Fig. 1 is a front elevation of the present preferred and illustrative embodiment of the invention with certain parts shown in section.
Figure 2:
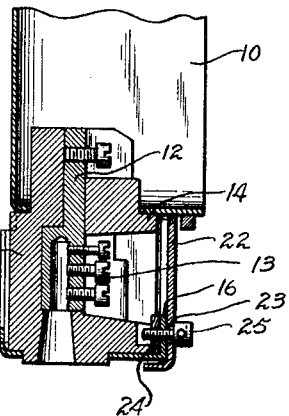
Fig. 2 is a fragmentary vertical section through the lower portion of Fig. 1.
Figure 3:
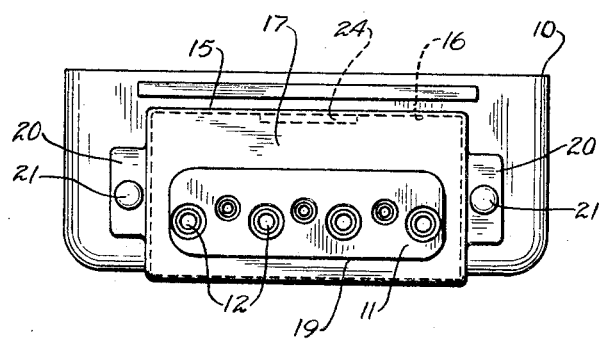
Fig. 3 is a bottom view of the structure shown in Fig. 1.

The present invention has for its object the simplification of the terminal mountings of electricity meters as well as the provision of means for efficiently protecting the terminals against damage.

In accordance with the present preferred embodiment of the invention, all the edges of the terminal base or block external to the body of the casing of the electricity meter are engaged and protected by a sheet metal frame which also serves to retain the terminal block on the body of the meter casing.

It will be understood that the foregoing general description and the following detailed description as well, are exemplary and explanatory of the invention but are not restrictive thereof.

Referring now in detail to the present preferred and illustrative embodiment of the invention as shown in the accompanying drawing, the invention is shown in connection with a conventional type of electricity meter which is mounted within the meter casing 10.

The terminal base or block may be formed of suitable molded insulating material 11, and has embedded in it the metallic terminals 12, which are to be connected with the several coils of the electric meter, and are also provided with screws 13 for connecting the meter in the electric circuit. The terminal block 11 is preferably formed with a stepped portion which extends into the body of the casing through an aperture at the lower side of the casing, and shoulders 14 limit the inward movement of the terminal block.

In the embodied form of the invention, the terminal block is retained in position and secured to the body of the meter casing by means of a sheet metal frame which surrounds the outwardly-projecting portion of the terminal block 11 and preferably comprises a piece of sheet metal 15 bent into a U-shape and having its edges 16 bent over at right angles to the sides 17 and bottom portions 18, thereby protecting those edges of the terminal block lying outside of the body of the casing. The bottom portion 18 of the sheet metal frame is preferably provided with a relatively large aperture 19 overlying the end of the insulating terminal block and through which the connecting wires may be inserted. For fastening the sheet metal frame 15 to the meter casing, the outer sides of the frame are each provided with lugs 20 bent at right angles to the sides 18 and by which the frame may be secured to the meter casing 10 by suitable means such as screws 21.

For securing the usual terminal box closure 22, an aperture 23 may be provided in the bent-over portion 16, and is reinforced by plate 24 provided with a threaded aperture into which screw 25 may be inserted. The head of screw 25 is preferably apertured in the usual manner so that it may receive the customary lead seal.

In order to make a tight joint between the terminal block 11 and the casing 10, suitable packing material such as cement may be placed between the casing and the shoulder 14 prior to the insertion of the terminal block in the casing, the cement being squeezed between the terminal block shoulder and the casing as the screws 21 are tightened.

The preferred embodiment of the invention above described affords excellent protection against damage to the edges of the terminal block, at the same time insuring an effective fastening of the terminal block to the measuring instrument, and this embodiment also provides terminal blocks in which the apertures leading to the metallic terminals 12 are not in direct proximity to the metal parts of the measuring instruments. This is advantageous as it substantially eliminates any danger of short-circuiting, should anyone attempt to connect or disconnect the meter without turning off the current, and the wire should be allowed to come in contact with the sides of the terminal apertures.

Although the illustrative embodiment of the invention shows the edges of the terminal block 11 protected by the turned-over portions 16 of the sheet metal frame, it is not essential that the frame should be so constructed, and if desired, these turned-over portions may be omitted, in which case the edges of the sheet metal frame would lie flush with the edges of the terminal block.

The invention in its broader aspects is not limited to the specific mechanism shown and described but departures may be made therefrom within the scope of the accompanying claims without departing from the principles of the invention and without sacrificing its chief advantages.

What I claim is:—

1. In an electricity meter, the combination of a meter casing having an aperture at one side thereof, a terminal block external to the casing and positioned adjacent to said aperture, a sheet metal frame engaging all the outside edges of said block and fitted closely to said block, said frame being formed of a single piece of metal and means for securely fastening said frame to said casing whereby said block is securely held against removal and the edges thereof are protected.

2. In an electricity meter, the combination of a meter casing having an aperture at one side thereof, a terminal block external to the casing and having a reduced portion projecting within the aperture, a unitary sheet metal frame engaging all the outside edges of the block and means for securely fastening said frame to the casing whereby said block is held against removal and the edges thereof are protected.

In testimony whereof, I have signed my name to this specification.

PAUL MOOS.